(No Model.) 2 Sheets—Sheet 2.
M. COVEL.
DEVICE FOR SWAGING AND JOINTING SAWS.
No. 359,134. Patented Mar. 8, 1887.
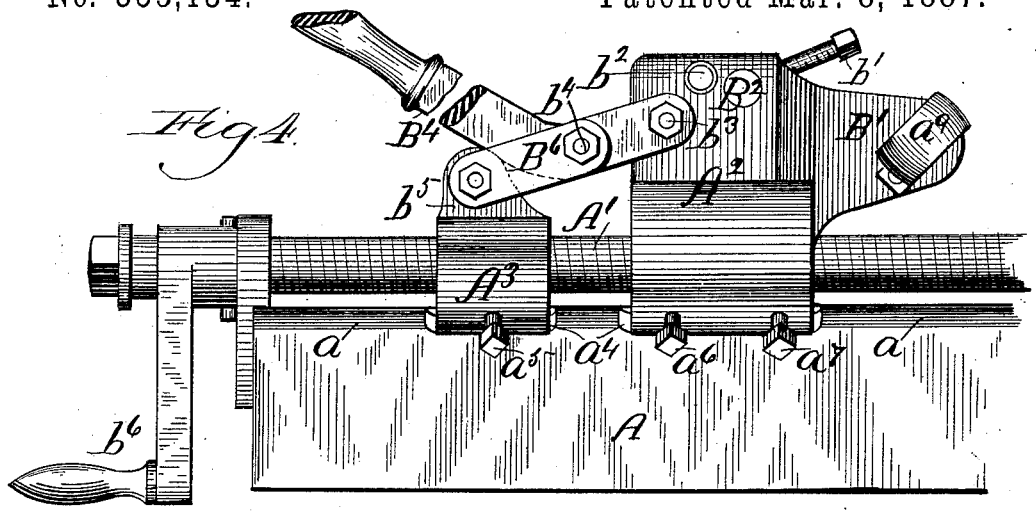
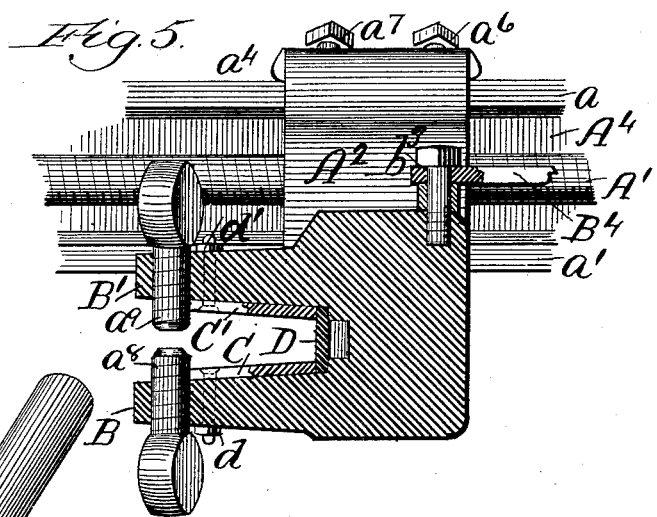
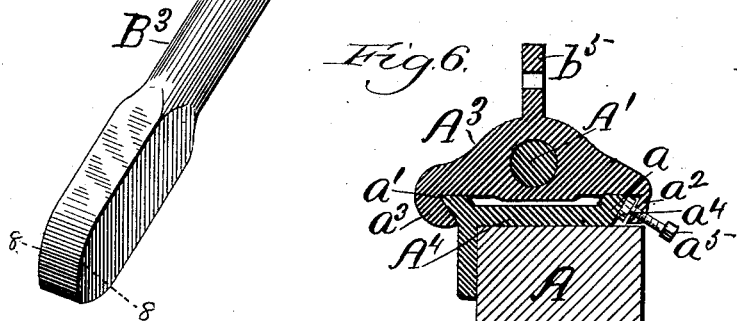
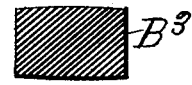
Witnesses:
Chas. E. Gayford
L. M. Freeman
Inventor:
Milo Covel.
By L. B. Coupland & Co.
Attys

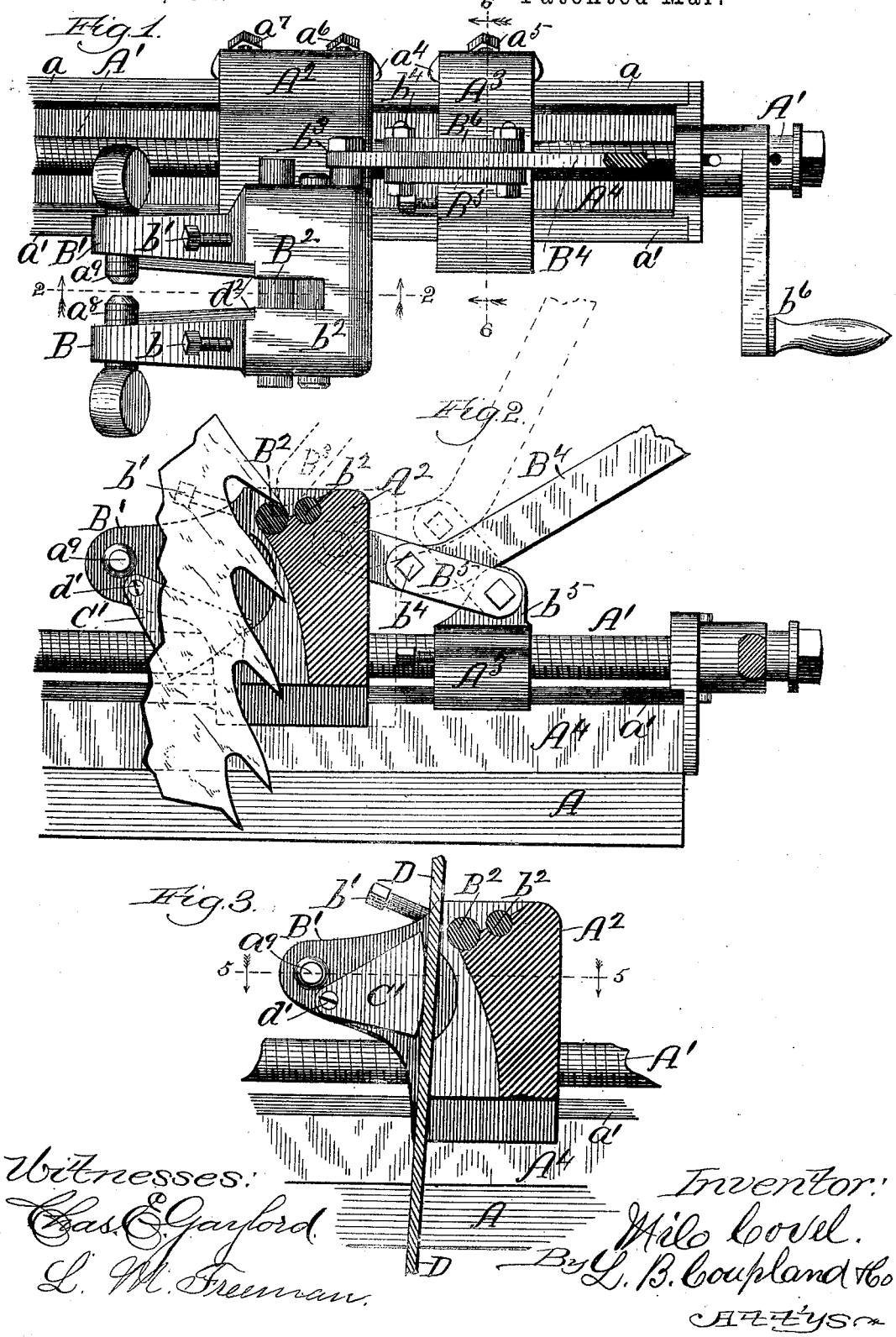

UNITED STATES PATENT OFFICE.

MILO COVEL, OF CHICAGO, ILLINOIS.

DEVICE FOR SWAGING AND JOINTING SAWS.

SPECIFICATION forming part of Letters Patent No. 359,134, dated March 8, 1887.

Application filed November 24, 1885. Serial No. 183,827. (No model.)

*To all whom it may concern:*

Be it known that I, MILO COVEL, of Chicago, county of Cook, and State of Illinois, have invented certain new and useful Improvements in Combined Saw Swage and Jointer, of which the following is a full, clear, and exact description, that will enable others to make and use the same, reference being had to the accompanying drawings, forming a part of this specification.

This invention relates to that class of devices that are more especially used on circular saws, and is intended to be attached to the saw-bench or other suitable support. (Shown in my United States Patent No. 259,372, of June 13, 1882.)

Figure 1 is a plan view; Fig. 2, a side elevation and partial section in the plane 2 2, Fig. 1, the saw being shown in position for swaging. Fig. 3 shows the same section of the anvil-block illustrated in Fig. 2, the saw being removed and the jointing-file placed in position. Fig. 4 is a view of the opposite side from that shown in Fig. 2; Fig. 5, a plan and horizontal section in the plane 5 5, Fig. 3; Fig. 6, a transverse vertical section in the plane 6 6, Fig. 1; Fig. 7, a view in perspective of a hand swaging-tool; and Fig. 8, a transverse section of the same in the plane 8 8, Fig. 7.

Referring to the drawings, A represents a supporting-timber, or one of the branch parts of the saw-bench shown in the patent above referred to; A', an endless adjusting-screw; $A^2$, an adjustable anvil-block; $A^3$, a screw follower-nut.

The supporting timber or frame A is provided on the upper side with the guide-plate $A^4$, rigidly secured thereto, and having the upwardly and outwardly projecting guide-edges $a\, a'$, as shown in Fig. 6. The under sides of the anvil-block $A^2$ and the screw-follower $A^3$ are provided with corresponding downwardly-projecting edges or jaws, $a^2\, a^3$, which overlap and engage with the guide-edges, (see Fig. 6,) thus preventing the anvil and follower from having a lateral movement or play. A gib, $a^4$, is inserted between the one side of the anvil and follower and the guide-edges, as shown in Figs. 1, 4, 5, and 6. These gibs are adjustably secured in place by the set-screws $a^5\, a^6\, a^7$. This construction and arrangement provides means for compensating for the wear of these parts, and prevents a lateral play or movement.

The anvil-block $A^2$ is arched on the under side, and does not have contact with the endless adjusting-screw. The anvil-block is provided on one side with the jaws B B', (see Figs. 1 and 5,) between which the saw is inserted during the process of dressing. The guide-screws $a^8\, a^9$ serve to hold the saw and adjust the same laterally.

$B^2$ is a round stationary die adjustably secured in the anvil-block by means of the screws $b\, b'$. Back of the stationary die is located the round pin $b^2$, which serves as a rest and guide for the hand swaging-tool $B^3$ (shown in Fig. 7 and indicated by dotted lines) in a working position. (See Fig. 2.)

The hand swaging-tool $B^3$ is rounding on the lower end, as shown in Figs. 7 and 8, so as to present a convex surface to the tooth, whereby the center or thickest part of the tooth will receive the force of the first few blows in the center and be gradually swaged outward by the time that the tool comes to a bearing the full width of the tooth, and thus prevent the edges from being spread out beyond what a proper dress requires.

The tool $B^3$ is held in one hand of the operator, and is struck by the blow of a hammer held in the other hand.

$B^4$ is a hand-lever pivoted to the anvil-block at $b^3$.

$B^5\, B^6$ are two links placed on each side of the hand-lever, as shown in Fig. 1, the inner ends of which are pivoted to the hand-lever by the bolt $b^4$, while the outer ends are pivoted to the lug $b^5$, formed on the top of the screw follower-nut $A^3$. This follower-nut has a threaded engagement with the endless adjusting-screw, and by means of the connection with the anvil-block, just described, the latter is moved away from or toward the saw, in accordance with the direction in which the endless screw is rotated. The object of this arrangement is to set the anvil-block in the exact position in accordance with the diameter of the saw to bring the teeth to a proper and uniform bearing on the stationary die or anvil $B^2$ to be operated upon by the swaging device. The anvil-block being once set, the endless screw will not be again rotated until all the teeth are swaged. In the process of swaging it is necessary of course to move the anvil-block back or away from the saw after each tooth is swaged, in order that the saw may be rotated to bring the teeth in succession to the die. This limited and positive movement is accomplished by bringing the hand-lever $B^4$ up to the position indicated by the dotted lines in Fig. 2, which operation draws back the anvil-block far enough for the teeth to clear the swaging-die. Throwing the lever $B^4$ down returns the anvil-block to a proper position to receive the next tooth, and so on in regular order of succession, thus bringing each tooth to a uniform bearing on the stationary swaging-die, which could not be done through the medium of the endless screw. The pivot-bolt $b^4$ forms the fulcrum for the hand-lever $B^4$, and the follower-nut $A^3$ the anchor, through the medium of the links $B^5$ $B^6$. The hand-crank $b^6$ provides the means for rotating the endless screw.

The triangular-shaped clamping-plates C C' are located on the inner sides of the jaws B B', and are adjustably secured thereto by the pivotal bolts $d$ $d'$, inserted in the back ends of the same, as shown in Figs. 2, 3, and 5. The jointing-file D (shown in Figs. 3 and 5) is inserted between the jaws B B' from below and rests in the shoulder-recesses $d^2$ (see Fig. 1) in a vertical position and just in front of the swaging-die.

The clamping-plates C C' drop down to the normal position shown in Fig. 2 during the process of swaging the saw, and should be raised up when the file is inserted, so as to bring the same into the relative clamping position shown in the sectional part of Fig. 5. The bearing ends of the clamping-plates are rounded, (see Fig. 3,) and are adapted to have an eccentric action, so that the heavier the downward pressure on the file the firmer the same is locked in place.

Having thus described my invention, what I claim as new, and desire to secure by Letters Patent, is—

1. In a saw swaging and jointing device, the combination, with an endless adjusting-screw, of a follower-nut having a threaded engagement with said endless screw, an anvil-block, means for connecting said follower-nut and anvil, and a guide-plate, whereby said anvil and follower are adapted to have an endwise adjustment, but locked against a lateral movement, substantially as and for the purpose set forth.

2. In a saw swaging and jointing device, the combination, with an anvil-block provided with jaws for receiving the saw, of an adjustable round die, a rest or guide-pin inserted back of said die, and a swaging-tool adapted to be held in the hand of the operator, substantially as set forth.

3. In a saw swaging and jointing device, the combination, with an anvil-block, of a hand-lever pivoted at one end thereto, a screw follower-nut, and the means described for connecting said follower and the hand-lever, whereby said anvil-block is adapted to have a limited endwise adjustment independent of the endless screw, substantially as and for the purpose set forth.

4. In a saw swaging and jointing device, the combination, with the described anvil-block, the interchangeable anvil, and file, of the triangular clamping-plates C C', substantially as and for the purpose set forth.

MILO COVEL.

Witnesses:
L. M. FREEMAN,
L. B. COUPLAND.